TAKE-UP REEL FOR CINEMATOGRAPHIC APPARATUS

Filed Jan. 14, 1966

Inventor:
Eduard Keznickl
By Kenneth(?) Montague
Attorney

United States Patent Office 3,325,112

Patented June 13, 1967

3,325,112

TAKE-UP REEL FOR CINEMATOGRAPHIC APPARATUS

Eduard Keznickl, Vienna, Austria, assignor to Karl Vockenhuber, Vienna, Austria, and Raimund Hauser, Vienna, Austria Filed Jan. 14, 1966, Ser. No. 520,623
Claims priority, application Austria, Jan. 18, 1965, A 378/65
6 Claims. (Cl. 242—74)

The present invention relates to a take-up reel for a cinematographic apparatus, in general, and to a take-up reel for a cinematographic apparatus with automatic threading of the film on the take-up reel, the core of the reel being provided with pick-up pins, to which the film hooks with its sprocket holes, thereby producing a driving connection with the reel, wherein the part bearing the pick-up pins is connected with the core of the reel by frictional contact, in particular.

The known film reels of this kind have a ring elastically surrounding the core of the reel and bearing the pick-up pins, which hook into the sprocket holes of the film. The ring is driven by frictional contact by the core of the reel. However this construction is not suitable for films with relatively small sprocket holes, because an exact orientation of the pick-up pins relative to the core cannot be attained and the production of small pick-up pins in this construction raises difficulties.

It is one object of the present invention to provide a take-up reel for a cinematographic apparatus with automatic threading of the film on the take-up reel in which these disadvantages are avoided. It is another object of the present invention to provide a take-up reel for a cinematographic apparatus with automatic threading of the film on the take-up reel in which the core of the reel is constructed with two connected hub parts. The hub parts define outer circumferential surfaces for carrying the film thereon, and adjacent at least one of the outer circumferential surfaces a substantially annular slot in which is arranged a disc bearing pick-up pins at its outer circumferential edge, and which may be elastically pressed against one of the two hub parts, preferably by a corrugated or saddle disc.

By this construction of the reel of the present invention it is possible to guarantee the required, exact orientation of the pick-up pins and to produce relatively thin pick-up pins.

With these and other objects in view, which will become apparent in the following detailed description, the present invention will be clearly understood in connection with the accompanying drawing in which.

Figures 1, 2:
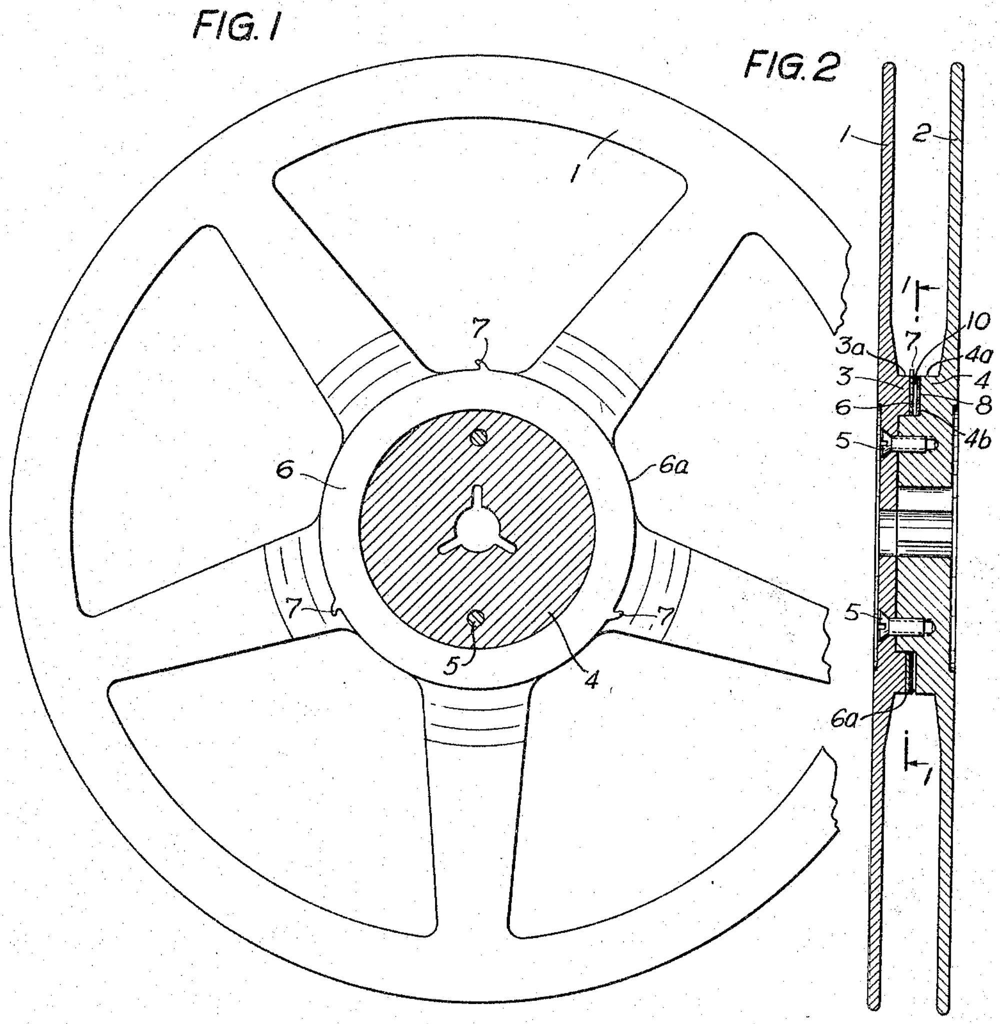
FIGURE 1 is a fragmentary section of the reel of the present invention along the lines 1—1 of FIG. 2.
FIG. 2 is an axial section of the reel of the present invention.

Referring now again to the drawing and more particularly to FIGS. 1 and 2, a reel in accordance with the present invention consists of two flanges 1 and 2, respectively, carrying hub parts 3 and 4, respectively. The hub parts 3 and 4 are axially connected to each other by screws 5.

The hub parts 3 and 4 form cylindrically aligned, outer circumferential surfaces *3a* and *4a*, respectively, and are constructed so that they are axially spaced from each other adjacent the outer circumferential surfaces *3a* and *4a*, the hub parts 3 and 4 thereby forming a substantially annular slot 10 or the like therebetween adjacent the outer circumferential surfaces *3a* and *4a*. As a variant, the annular slot 10 may be integrally formed in one of the two hub parts.

Figure 3:
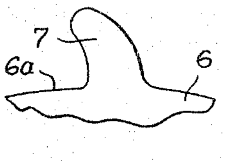
FIG. 3 is an enlarged fragmentary view of the disc showing a pick-up pin.

A sheet metal disc 6 provided at its outer circumferential edge *6a* with three pick-up pins 7 (FIG. 3) is inserted in the annular slot 10 between the hub parts 3 and 4.

A resilient means is provided for pressing the disc 6 in frictional engagement against one of the hub parts, such as a corrugated or saddle disc 8 placed in the slot 10 between the disc 6 and the hub part 4 pressing the disc 6 against the hub part 3, thereby producing the required frictional contact. Instead of a separate corrugated or saddle disc 8, the disc 6 itself may be manufactured from elastic material and formed as a corrugated or saddle disc.

With the new construction of the reel of the present invention an especially precise and reliable operation is guaranteed.

While I have disclosed several embodiments of the present invention, it is to be understood that these embodiments are given by example only and not in a limiting sense, the scope of the present invention being determined by the objects and the claims.

I claim:

1. A take-up reel for a cinematographic apparatus with an automatic threading of the film having sprocket holes on the take-up reel, comprising
   two flanges,
   two hub parts, each connected respectively to one of said flanges and connected with each other and defining a common axis,
   said hub parts defining outer circumferential surfaces, respectively aligned, for carrying said film thereon, and defining adjacent at least one of said outer circumferential surfaces a substantially annular slot,
   a disc having an outer circumferential edge and held in said annular slot, and
   said disc including a plurality of pick-up pins arranged at said outer circumferential edge of said disc and adapted to hook into said sprocket holes of said film.

2. The take-up reel, as set forth in claim 1, further comprising
   resilient means provided in said annular slot for pressing said disc against one of said hub parts.

3. The take-up reel, as set forth in claim 2, wherein said resilient means comprises a separate corrugated disc disposed in said annular slot contiguously between said disc and the other of said hub parts.

4. The take-up reel, as set forth in claim 1, wherein said disc is elastically resilient and corrugated and disposed in said annular slot pressing against at least one of said hub parts.

5. The take-up reel, as set forth in claim 1, wherein at least portions of said hub parts being spaced apart adjacent said outer circumferential surfaces to define said substantially annular slot between said hub parts.

6. The take-up reel, as set forth in claim 5, further comprising
   resilient means provided in said annular slot for pressing said disc against one of said hub parts, and
   said resilient means comprises a separate corrugated disc disposed in said annular slot, contiguously between said disc and the other of said hub parts.

References Cited

UNITED STATES PATENTS

| | | | |
|---|---|---|---|
| 1,322,114 | 11/1919 | Jenkins | 242—74.2 |
| 1,799,748 | 4/1931 | Hayden | 242—74 |

FRANK J. COHEN, *Primary Examiner.*

N. L. MINTZ, *Assistant Examiner.*